(12) United States Patent
Krueger

(10) Patent No.: US 7,757,210 B1
(45) Date of Patent: Jul. 13, 2010

(54) OBJECT FRAMEWORK

(75) Inventor: Uwe Krueger, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 950 days.

(21) Appl. No.: 10/609,126

(22) Filed: Jun. 27, 2003

Related U.S. Application Data

(60) Provisional application No. 60/393,053, filed on Jun. 28, 2002.

(51) Int. Cl.
*G06F 9/44* (2006.01)
*G06F 3/048* (2006.01)
*G06F 3/00* (2006.01)

(52) U.S. Cl. ............... 717/120; 717/106; 717/108; 717/109; 717/116; 715/757; 715/758; 715/759; 715/762; 715/763; 715/764

(58) Field of Classification Search ............... 717/120; 709/201–244
See application file for complete search history.

(56) References Cited

U.S. PATENT DOCUMENTS

| | | | | |
|---|---|---|---|---|
| 5,220,657 | A * | 6/1993 | Bly et al. ............ | 711/152 |
| 5,745,910 | A | 4/1998 | Piersol et al. ............ | 707/515 |
| 6,243,862 | B1 * | 6/2001 | Lebow ............ | 717/131 |
| 6,289,382 | B1 * | 9/2001 | Bowman-Amuah ............ | 709/226 |
| 6,321,252 | B1 * | 11/2001 | Bhola et al. ............ | 709/204 |
| 6,378,001 | B1 * | 4/2002 | Aditham et al. ............ | 719/313 |
| 6,536,037 | B1 * | 3/2003 | Guheen et al. ............ | 717/151 |
| 6,560,707 | B2 * | 5/2003 | Curtis et al. ............ | 713/163 |
| 6,826,595 | B1 * | 11/2004 | Barbash et al. ............ | 709/204 |
| 2001/0044827 | A1 * | 11/2001 | Zhuk ............ | 709/205 |
| 2002/0029300 | A1 * | 3/2002 | Okada et al. ............ | 709/318 |
| 2002/0103824 | A1 * | 8/2002 | Koppolu et al. ............ | 707/501.1 |
| 2003/0037109 | A1 * | 2/2003 | Newman et al. ............ | 709/204 |
| 2003/0051136 | A1 * | 3/2003 | Curtis et al. ............ | 713/163 |
| 2004/0104935 | A1 * | 6/2004 | Williamson et al. ............ | 345/757 |
| 2006/0059253 | A1 * | 3/2006 | Goodman et al. ............ | 709/223 |

OTHER PUBLICATIONS

Huang et al., "A General Purpose Virtual Collaboration Room," IEEE, pp. 1-10, Oct. 1999.*
Portual et al., "A Customizable Collaborative virtual environment on the Web," IEEE, published on 1999.*
CVW, "Collaborative Virtual Workspace Overview," sourceforge.net, pp. 1-5, Oct. 13, 2000.*
Portugal et al., "A customizable collaborative virtual environment on the Web," IEEE, Sep. 1999.*
Pirri et al., "A Java applet-based virtual environment as a usable interface to distributed services and collaborative applications on the Internet," IEEE, Jun. 1999.*
Yang et al., "Transaction Management in Collaborative Virtual Environments," Jul. 26, 1999.*

(Continued)

*Primary Examiner*—Insun Kang
(74) *Attorney, Agent, or Firm*—Mintz Levin Cohn Ferris Glovsky and Popeo, P.C.

(57) ABSTRACT

An object framework can provide unique and uniform methods for explicit and precise object identification. The object framework features a virtual object space providing access to multiple objects, each object having a set of functionality and being identifiable by a unique identifier provided by the virtual object space. A visualization framework visualizes objects independent of an application implementing an object. Each object is visualized using the object's unique identifier and according to the object's corresponding set of functionality.

11 Claims, 9 Drawing Sheets

OTHER PUBLICATIONS

Lucco, "Prallel programming in a Virtual Object Space," ACM, 1987.*

Phillips, Richard L., "MediaView: A General Multimedia Digital Publication System," *Communications of the ACM*, Jul. 1991, vol. 34, No. 7, pp. 75-83.

Phillips, Richard L., "An Interpersonal Multimedia Visualization System," *IEEE Computer Graphics & Applications*, May 1991, pp. 20-27.

Phillips, Richard L., "MediaView: An Editable Multimedia Publishing System Developed with an Object-Oriented Toolkit," USENIX, Summer 1991, Nashville, TN, pp. 125-136.

"A CORBA® Primer," CORBA® Products Technical White Paper from Segue Software, Feb. 2001, pp. 1-7.

"CORBA® Basics" [online]. 5 pages. © 1997-2003 Object Management Group, Inc. <http://www.omg.org/gettingstarted/corbafaq.htm>, last updated May 21, 2002.

Brockschmidt, Kraig, "Developing Applications with OLE 2.0" [online]. Sep. 13, 1994. 17 pages. © 2003 Microsoft Corporation. <http://msdn.microsoft.com./library/en-us/dnolegen/html/msdn_devwole2.asp?frame=true>.

Brockschmidt, Kraig, "What OLE Is *Really* About" [online]. Jul. 1996. 39 pages. © 2003 Microsoft Corporation. <http://msdn.microsoft.com/library/en-us/dnolegen/html/msdn_aboutole.asp?frame=true>.

Brockschmidt, Kraig, "OLE Integration Technologies: A Technical Overview" [online]. Oct. 1994. 17 pages. © 2003 Microsoft Corporation. <http://msdn.microsoft.com/library/en-us/dnolegen/html/msdn_ddjole.asp?frame=true>.

Kindel, Charlie, "Local vs. InProc Objects in OLE" [online]. Mar. 10, 1994. 5 pages. © 2003 Microsoft Corporation. <http://msdn.microsoft.com/library/en-us/dnolegen/html/msdn_inproc.asp?frame=true>, last updated Oct. 18, 1994.

Kindel, Charlie, "OLE Property Sets Exposed" [online]. Aug. 27, 1993. 21 pages. © 2003 Microsoft Corporation. <http://msdn.microsoft.com/library/en-us/dnolegen/html/msdn_propset.asp?frame=true>, last updated Oct. 6, 1995.

Hodges, Douglas, "Managing Object Lifetimes in OLE" [online]. Aug. 25, 1994. 36 pages. © 2003 Microsoft Corporation. <http://msdn.microsoft.com/library/en-us/dnolegen/html/msdn_objlife.asp?frame=true>, last updated Nov. 18, 1994.

Rodent, Herman, "OLE for Idiots: A Is for Attitude" [online]. Jun. 22, 1993. 6 pages. © 2003 Microsoft Corporation. <http://msdn.microsoft.com/library/en-us/dnolegen/html/msdn_ole2a.asp?frame=true>.

Rodent, Herman, "OLE for Idiots: B Is for Beginning" [online]. Jun. 22, 1993. 7 pages. © 2003 Microsoft Corporation. <http://msdn.microsoft.com/library/en-us/dnolegen/html/msdn_ole2b.asp?frame=true>.

Rodent, Herman, "OLE for Idiots: C Is for Container" [online]. Aug. 6, 1993. 27 pages. © 2003 Microsoft Corporation <http://msdn.microsoft.com.library/en-us/dnolegen/html/msdn_ole2c.asp?frame=true>.

Rodent, Herman, "OLE for Idiots: D Is for Dragon" [online]. Sep. 20, 1993. 10 pages. © 2003 Microsoft Corporation. <http://msdn.microsoft.com/library/en-us/dnolegen/html/msdn_ole2d.asp?frame=true>.

"OLE DB Leveling: Choosing the Right Interfaces," Microsoft OLE DB Web Page, May 4, 1998, 8 pages.

* cited by examiner

OBJECT FRAMEWORK

CROSS-REFERENCE TO RELATED APPLICATIONS

This application claims priority to U.S. provisional application Ser. No. 60/393,053, filed Jun. 28, 2002.

COMPUTER PROGRAM LISTING

This application includes a computer listing appendix provided on a CD submitted to the Office labeled "COPY 1", located in the computer file named "Computer listing for application serial No. 10609126 entitled Object Framework", and having a file size of 80 KB, the content of which is hereby incorporated by reference in its entirety.

BACKGROUND

The following description relates to an object-based framework that provides a basis for integration of backend elements at a user interface level.

There are several ways to design and implement applications. Typically, the application determines the items that can be handled by the application, and the exclusive operations available to the items. For example, to read email, an email application is used, and to create an electronic document, a separate text processing application is used. This approach can be convenient for the application developer, as the developer need only deal with his/her own context, and is not restricted in modeling different items. However, from a user's perspective, different tasks require different applications, each with a different notion of an item and perhaps with a different user interface. To handle an item, a user must select the appropriate application, perhaps toggling between several applications at one time to deal with several different items. Typically, each of these applications provides an analogous basic feature set for the user interface, for example, an object browser or a preview pane. However, each can look slightly different and typically it is not possible for one to handle objects provided by other applications.

Alternatively, separate applications may handle different aspects of the same abstract element, requiring a user to know what operation needs to be performed on an element and which application to select to perform the desired operation. Different applications can use different representations for the same data. A common database and data scheme for different applications that share the same data can address this problem, for example, the common database and data scheme provided by SAP® R/3® available from SAP AG of Walldorf, Germany, for its applications and different applications that share data. Alternatively, explicit matching and replication mechanisms can address the problem. However, even sharing (virtually) common data maintains an application-centric approach, and it can be difficult, if not impossible, to handle items of one application in another application.

So-called "frame applications" can handle items of some related applications. For example, the Microsoft Outlook® application is able to handle many different functions related to mailing, messages and tasks. However, these functions are integrated in one large application (namely, Microsoft Outlook) that handles its own folder management for organizing these items inside the frame application. In general, it is not feasible to extend the set of item types that can be handled by the application. This approach may provide increased user-friendliness over the separate-applications approach, but ultimately is just a new kind of larger application. A user generally cannot mix the user's items with items of other applications or application groups, and cannot organize items in his/her own way.

The World Wide Web allows multiple independent applications to run in the same frame, linked together with loosely coupled links. In this sense, a web browser essentially can take the role of an operating or window system, in that the browser provides a desk or work place that can be filled with different types of items, all in the same frame. An enterprise portal is an example of a web-browser-based frame application that facilitates the presentation of disparate resources to a user.

In general, the separate-applications approach still prevails, and in this case a user-interface abstraction referred to as a "launch pad", which is a substitute for complex menu structures, may be used to launch applications running independently in different explicit or simulated sub-frames.

SUMMARY

In general, in one aspect, apparatus and techniques relating to an object framework feature a virtual object space providing access to a plurality of objects, each object having a set of functionality and being identifiable by a unique resource identifier provided by the virtual object space. A visualization framework visualizes objects independent of an application implementing an object. Each object is visualized using the object's unique resource identifier and according to the object's corresponding set of functionality.

Implementations can include one or more of the following. The virtual object space can further provide generic object functionality for the plurality of objects. The generic object functionality can include at least one or more of the following: associations and transactions functionality for relating objects and interaction between objects; distribution functionality for distributing the virtual object space; and persistency functionality for maintaining persistency of the objects. The framework can further include framework services providing common event handling of the plurality of objects.

In general, in another aspect, the techniques and apparatus feature a software-implemented object browser framework including a virtual object space providing access to a plurality of objects, a user interface and a visualization framework. Each object is identifiable by a unique resource identifier. The user interface receives input from a user relating to a desired arrangement of one or more software objects. The visualization framework visualizes objects according to the desired arrangement. Each object is visualized using the object's unique resource identifier independently of an application implementing the object.

Implementations can include one or more of the following. The user interface can enable a user to browse and/or arrange the plurality of objects independent of the respective applications implementing the objects. The objects can be arranged, for example, by a user, in any desired or arbitrary manner without regard to which applications implement which objects. The arrangement can be hierarchical in nature, similar to a tree or file system structure, again without regard to object type. The visualization framework can include an object viewer.

Implementations can realize one or more of the following advantages. An object framework can be implemented to provide unique and uniform methods for explicit and precise object identification, which applications can use to quickly and easily access objects. The framework can be responsible for dispatching method invocations from the caller to the appropriate application, which deploys the object.

Also, the framework can supply a standardized set of non-specific functionality shared by all objects that provides access to common object features. Among these may be methods to obtain link information about objects in order to display icons, names, or short descriptions at a user interface (UI) level, or to provide access to a sub-hierarchy of objects ("below") as child objects. Moreover, the framework may provide techniques for retrieving information usable to build object-specific context menus. Altogether, these features may serve as the object backbone of the object framework. The underlying technology is referred to as the Virtual Object Space (VOS), which may serve as an object-oriented architectural basis for a collaboration framework of a collaborative room environment.

More particularly, the object framework described here can be implemented to provide a generic, hierarchical browser in which, for example, a user can browse through a work space including objects relevant to the user, independent of the applications implementing the objects. Moreover, the generic hierarchical browser, can enable a user to organize objects of disparate types in his or her own desired hierarchy either in any arbitrary manner desired by the user and/or in predefined structures provided by the applications. Objects can be viewed everywhere and any time without using the traditional application concept for viewing objects.

In addition, the object framework described here can be implemented to provide an identifier, for example a Uniform Resource Identifier (URI), for each different object. As a result, objects can be moved around among disparate applications, for example, using drag&drop or cut&paste user manipulations, and independently of particular applications implementing the objects. Moreover, objects can be connected by application-independent relations.

The details of one or more embodiments are set forth in the accompanying drawings and the description below. Other features and advantages will be apparent from the description and drawings, and from the claims.

DRAWING DESCRIPTIONS

Like reference symbols in the various drawings indicate like elements.

DETAILED DESCRIPTION

The techniques described here may be used to implement an object-based framework, which in one implementation, allows a generic object browser to be used as a common collaborative work space in which a user can browse all objects relevant to the user, independent of the application or applications implementing the objects. An object is an item that can be handled separately. The object has its own unique identity, and is the basis for invoking operations that implicitly act on the state of the item for which they are invoked.

The object framework is centered on the objects comprising the applications rather than on the applications themselves. In that sense, the object framework is object-centric rather than application-centric. An application as a separate component is put into the background, and potentially is transparent to a user at the user interface level. As a result, a user can handle objects directly, without needing to know what process or application is required to do so.

Additionally, a user can organize objects he or she works with in his or her own fashion, for example, using a generic object browser (described below). As one example, a user can group random objects into a folder hierarchy built by the user, rather than provided by an application. Objects belonging to different applications can be grouped together into one folder, to allow fast and simple access to the objects, without requiring the user to select an application and then, once inside an application, to find the desired objects. Such folders, which can be referred to as folder objects, can be provided by applications, which are examples of generic applications (referred to below as generic services) that can deal with a broad range of objects, without needing to know an object's type or the application implementing the object.

Figure 1:
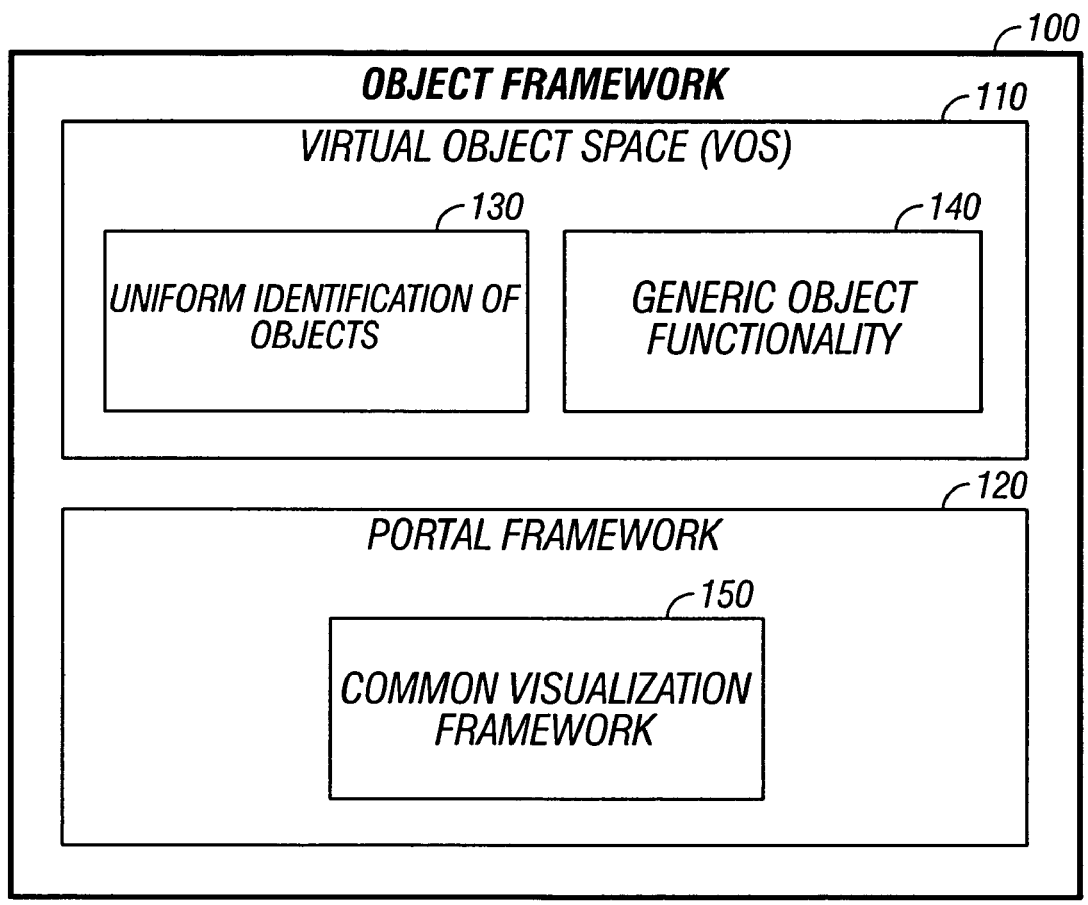
FIG. 1 is a representation of an object framework

Referring to FIG. 1, an object framework 100 includes a virtual object space ("VOS") 110 and a portal framework 120. The VOS 110 is the object backbone of the object framework 100, and features uniform identification of objects 130 and a standard object functionality provided by each object within the VOS. Additionally, based on the uniform object identification and the standard object functionality, the VOS includes a basic set of generic object functionality 140, that can be extended by generic services. The portal framework 120 includes a common (VOS related) visualization framework 150 based on a technical UI framework, depending on the desired front-end technology.

The object framework 100 is independent of any programming language and constructional environment. However, due to the object framework's object-oriented approach and a field of application within a web environment, a modern object-oriented programming language, for example, Java, can be used to implement the object framework 100. The object framework 100 will be described below in terms of a Java implementation, but as already stated, can be implemented using another suitable programming language.

For the purpose of describing the object framework, an illustrative example may be helpful. Consider the situation of a user working on a design project. The user has a number of objects related to the design project, including, for example: text documents, spreadsheets, graphic presentations, links to web pages, scanned documents, email messages, material list, business partners, team members and drawings. The user desires to organize the objects into various folders, for example, a 'design project' folder, which includes all of the objects related to the design project. As another example, the user wishes to create an 'ideas' folder, which includes objects relating to ideas for the design project. As a third example, the user wishes to create a 'specification' folder, which includes all objects related to the design projects specifications.

Because the user has objects of varying types related to the design project, each of the three mentioned folders will include varying types of objects. That is, objects that are created and deployed by different applications, for example, text documents created by Microsoft® available from Microsoft Corporation of Redmond, Wash., and spreadsheets created by Lotus 1-2-3 available from IBM Software Group of Cambridge, Mass. Using the object framework, the user can browse the different types of objects in a workspace that is independent of the applications behind the objects, and can organize the objects in a manner that is desirable to the user, without regard to the objects being of different types.

The Virtual Object Space (VOS)

The VOS 110 provides the basis for the generic interaction of different objects and applications that do not need to know one another. The main task of the VOS is to support a uniform way to identify objects and to specify a standard object interface. In order to effectively carry out a task, identifiers and methods declared in the object framework need to be mapped to concrete implementations. That is, applications are still required to execute operations. Each type of object known to the object framework 100 is implemented and deployed by one application. These applications are referred to as object services.

Figure 2:
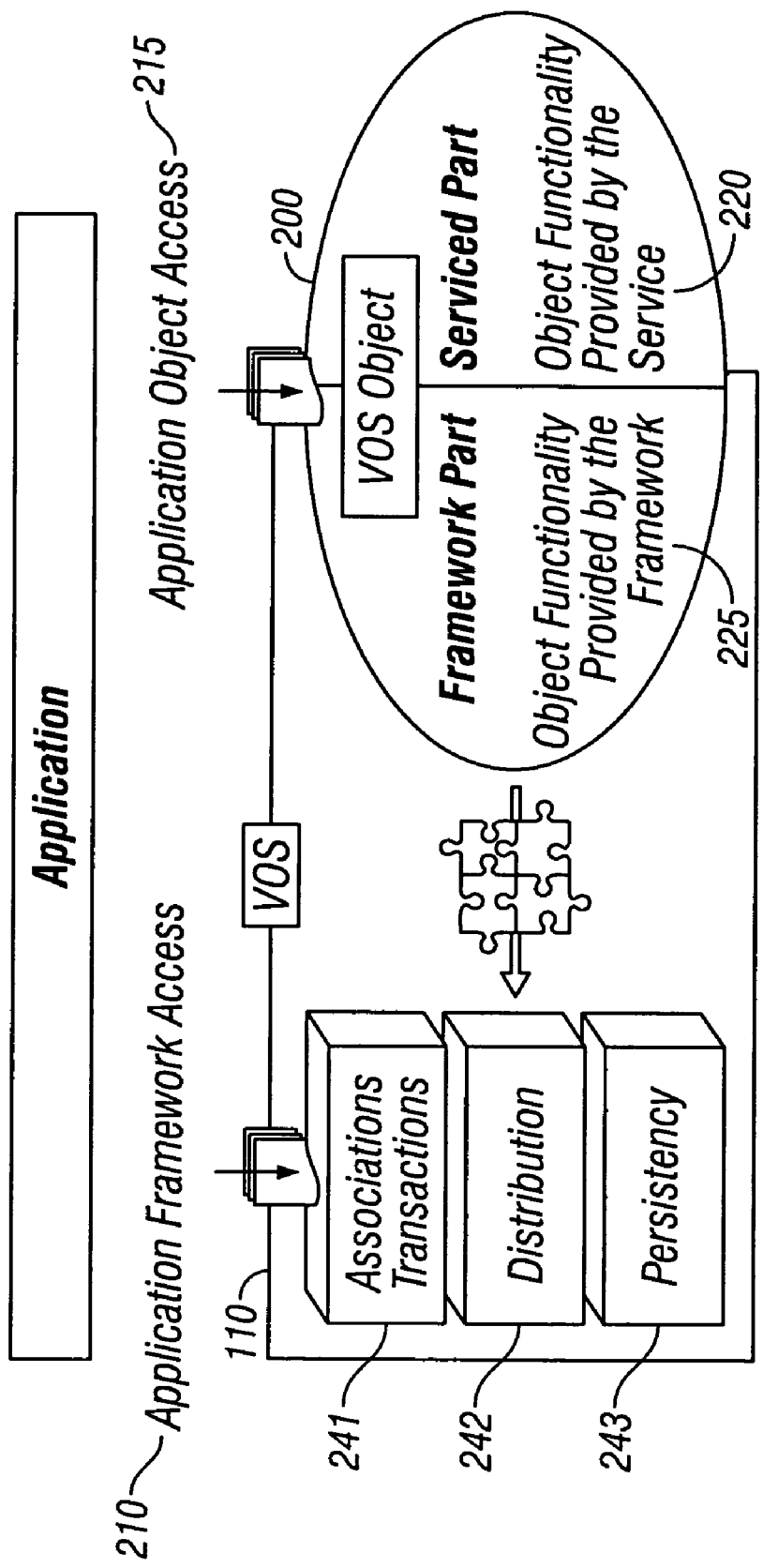
FIG. 2 is a representation of a VOS object.

Referring to FIG. 2, beneath the operations implemented by a dedicated object type, there can also be common operations that are the same for all objects. Such operations are provided by the object framework 100 and are used for the interaction of objects, for example, event registration and firing mechanisms. To accomplish this, the object framework 100 can also provide some interfaces and implementation layers that are not object related, for example, an association and transaction mechanism 241. Below these top level mechanisms, there can be additional support layers, for example, for the distribution 242 of the object space and a simple persistence support layer 243.

The object framework provides some interfaces 210 for applications using objects of the object space and the framework functionality, as well as interfaces 215 for services that want to deploy objects. This latter class of interfaces is separated into an interface 220 that must be implemented by the service implementation for an object and an interface 225 that can be used by these implementations to access framework functionality.

VOS Object

The VOS object represents the nucleus of the VOS model. The object based approach encapsulates functionality inside the VOS object itself. The VOS object is responsible for the implementation and actions necessary for fulfilling an external contract. Therefore, a user of a VOS object need only know two things to work with any kind of object: the existence of the object or its reference, and the contracts or operations the object can fulfill.

VOS Object—Standard Methods

The object model can also provide basic mechanisms to get basic information about an object that can be used in the visualization framework to automatically create annotated links to the object in the UI and to launch common operations on the object used in the visualization framework. Each VOS object must provide some functionality, such as common standard methods. For example, a method display or execute can be used by a directory object to display a VOS object (e.g., in response to a user clicking the object) without any knowledge about the VOS object or its implementation. This is an example of a generic method that sends a display event to the appropriate visualization framework. With these two methods, it is possible to implement generic directory objects that can contain any kind of object.

The contents can be visualized in a generic manner and the execution can be used to "call" the objects. If, for example, another function is added, a getChildren method, it is possible to provide a generic hierarchical object browser in the object framework, because each object is able to deliver its subobjects lower in the hierarchy. The resulting object or directory hierarchy can be handled and visualized in a generic way without further knowledge of the objects. Even more, a VOS object can then return children or component objects dynamically (depending on the session context) or statically.

The following are some examples of methods that can be useful for generic object handling:

getIdentifier to query the object identifier,
getName to query a name for the object,
getLongDesc to query a long description of the object,
getShortDesc to query a short description of the object,
getIcon to return a URI for an icon bitmap,
getChildren to query a list of child objects (links) provided by the object,
getVisualization to return a portlet for viewing and changing the object contents.

Figure 3A:
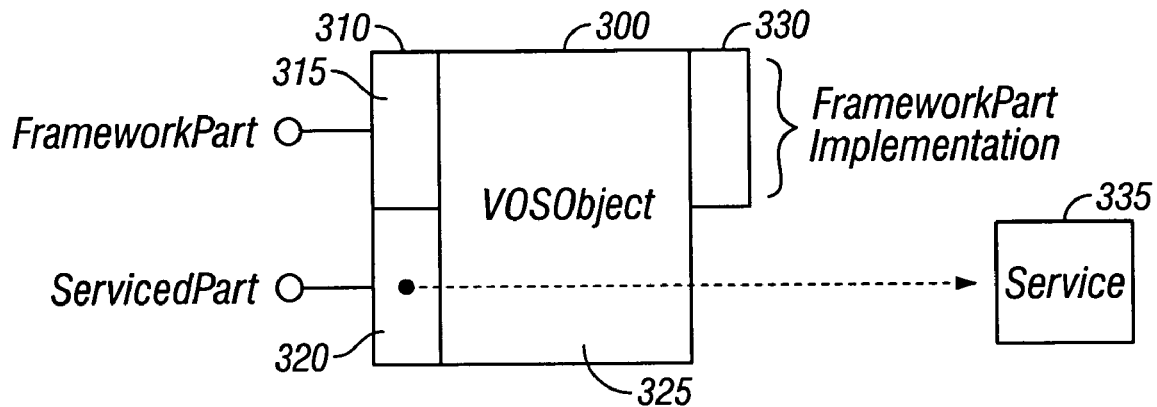
FIG. 3A is a representation of an object framework
Figure 3B:
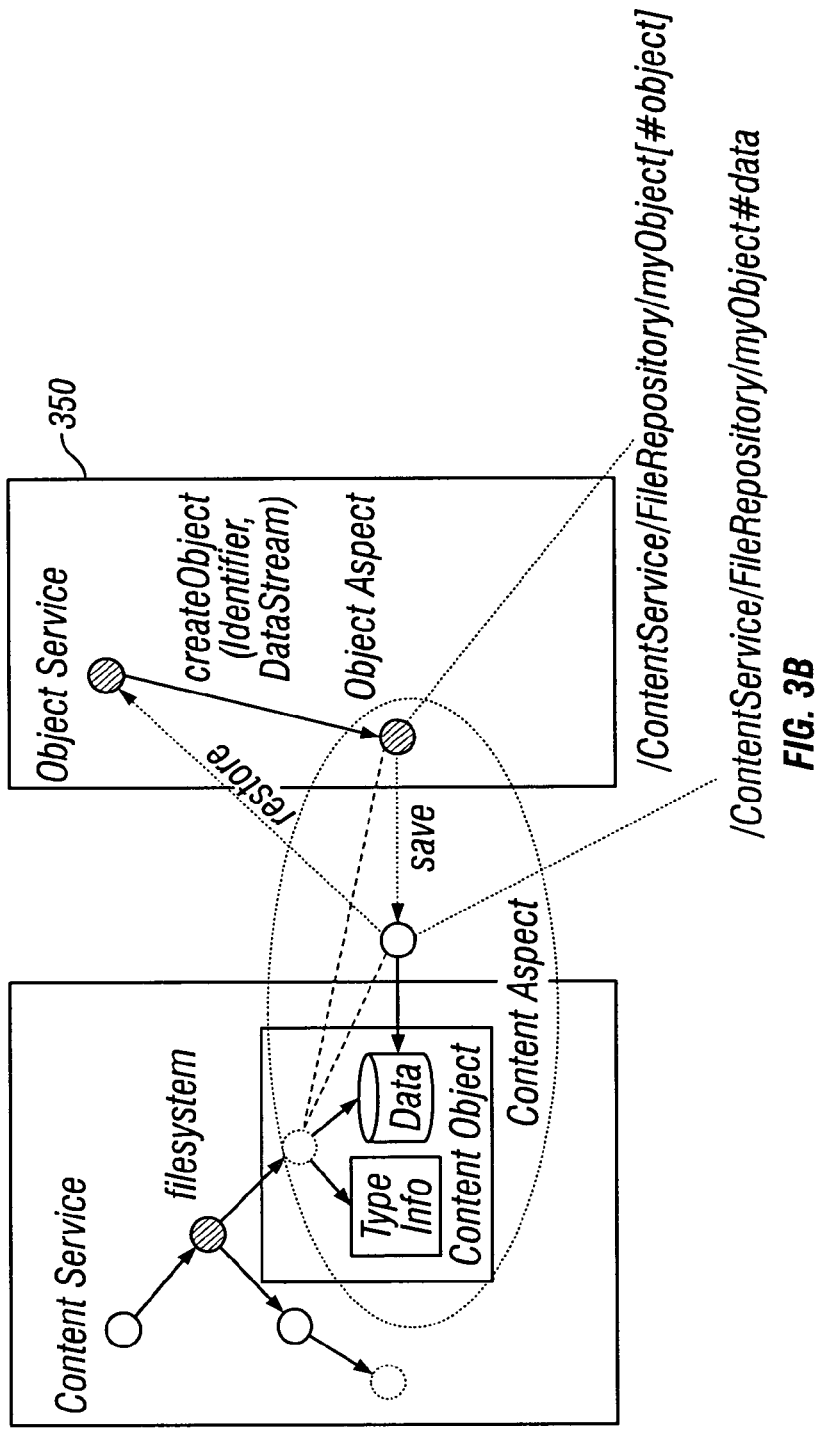
FIG. 3B is a schematic representation of a content service in relation to an object service.

Referring to FIG. 3 the VOS object 300 provides an external standard interface 310, referred to as the VOS object interface, which includes two separate interfaces, namely the framework part 315 and the serviced part 320. In the Java implementation, both parts can be combined into a single Java object, that is used as a representative for the VOS object and that can be used by other applications implemented in Java to access the object's functionality. Additionally, the VOS object 300 includes two internal interfaces. There is an internal interface to the generic framework implementation of some generic aspects of the VOS object, and an internal interface for the implementation of a standard set of methods to be implemented by the object service. This interface is used for the interaction between the object framework and the implementing object service. The latter internal interface includes the methods of the serviced part 320 plus some methods not visible on the external VOS object interface 310, which are required by the object framework itself to handle the interaction between the object framework and implementations by the object service.

Framework Services

As mentioned above, services provided to VOS objects by the framework can include operations for interaction of objects, such as event registration and firing mechanisms, remote access to objects, relation implementations or a view registry to extend a visualization assignment coming with the implementation of an object service. A viewer assignment can be used, for example, to assign specialized viewers for dedicated objects, depending the properties of the objects. For example, a folder viewer can replace a standard viewer for folders that are specialized, such as, a folder including only users that can be displayed by a set of pictures, or a folder including countries that can be displayed as a list of flags.

Service-Specific Functionality

The object service itself is an object in the object framework. Because of the object service's specialized task, there is an extension of the standard object interface especially for services, that includes methods to map identifiers to VOS objects belonging to the object service. This interface is used by the object framework to check the validity of objects' identifiers and to map general identifiers to VOS object representatives in a dedicated implementation environment.

Referring to the design project example introduced above, the various objects related to the user's design project are VOS objects, which can be visualized and operated upon with a VOS. That is, each text document, spreadsheet, email message, team member, business partner, contract or invoice etc. is a VOS object. An example of service specific functionality is the functionality provided by the Microsoft® Word application to edit a text document type VOS object, or the functionality provided by the Lotus 1-2-3 application for a spreadsheet type VOS object.

It should be noted that the VOS is not necessarily data oriented like, for example, a file system in a Microsoft Word application. That is, a file system typically includes folders that contain data objects. The type for the file system is a stream of bytes, and there is an external mapping of content types to applications, for example, Microsoft Word, that can be used to display the corresponding data. These applications use a data object provided by the file system to restore the object's internal object representation.

By contrast, a VOS object is not necessarily a pure data container, but can be the semantic object behind the data. A VOS object is not a medium to store persistent data as such. Rather, the persistence of the VOS objects in the object framework are handled by object services. Although there can be services that provide things like files, and those files can be used by other object services to map their content to semantical aspects of such (storage) objects, these are application patterns for the object framework, and the object framework itself does not need to know such details.

Referring to FIG. 3A, a schematic representing a mapping of a traditional file system with data stream based objects into the object framework is shown. The object service 350 provides semantical objects (e.g., an MS Word document or MS Powerpoint document) out of data containers. For the object framework, there can be two aspects and each can be handled like a separate object. The aspects can include a data container object provided by a data container service, and a semantic object provided by the appropriate object service.

Generic Object Functionality

As stated above, beneath the operations implemented by a dedicated object type, there are also common operations that are the same for all objects. Such operations are provided by the object framework 100 or the framework services and are used for the interaction of objects, for example, the object framework can keep track of all parents of which a VOS object is a child, and can implement a getParents method family.

To realize these communal features, which are shared among VOS objects, the VOS can include some interfaces and implementation layers that are not directly related to any specific VOS object, but to all VOS objects in the object framework. For example, as shown in FIG. 2, three such layers can include association and transaction mechanisms 241, distribution mechanisms 242 and a simple persistency layer 243. The additional features and layers are implementation dependent. For example, to support transactions there is a network based two-phase commit mechanism that can be used locally to handle different memory copies of object states. This generic handling influences the interface between the object framework and the object services, but is rather implementation dependent. The transactional behavior is not necessarily required for the basic idea behind the object framework.

The object framework can provide a mechanism to classify general relations between objects into categories. These categories can be referred to as associations and describe possible associates as well as the meaning of relations. For example, there may be a 'note' association defined, allowing attachment of note objects to other objects. As another example, there may be a parent-child link, defining structural succession of objects. Since these associations are completely provided by the object framework, services do not need to support, or even know about, these features. Because of the special meaning of the parent-child relationship to the structure of the VOS, this relationship can be put to the standard object interface. Therefore, a VOS object has control over this relationship, and can decide which objects to return as children, or for dynamic linking and unlinking, which objects to allow as children or which objects to allow to be removed as children.

An object framework can include a distribution layer 242 responsible for handling the distribution of the VOS. A typical implementation of the object framework in an object-based programming environment requires the representation of VOS objects as objects of the used programming language, for example, Java objects. These means the usage of memory copies of the objects. Therefore, the object framework has to handle the synchronization of memory copies in different address spaces, if the same object space should be used on multiple machines. As such, locking and flushing must be part of such implementation, which in general leads directly to a rudimentary transaction semantic.

The object framework can include a persistency layer 243 for both framework persistency and service persistency. Service persistency can provide sophisticated routines implemented within the service to handle complex storing behavior. Framework persistency can refer to serialization of attributes that are stored with a VOS object identifier by the object framework. For example, Java provides a sophisticated serialization mechanism to transfer objects into a data stream and visa versa. Before a VOS object can be persisted, it must be mapped to an object of the implementation environment, i.e., to a representation of the VOS object within a specific programming language, for example, a Java object. Accordingly, as discussed above, the object framework must include rudimentary transaction mechanisms, in order to handle synchronization of memory copies and to coordinate locking and flushing processes. Depending on the chosen implementation of the object framework, a support of such features can require extending the interface between the object framework and the object service to handle multiple memory copies for reading and writing.

VOS Service

As mentioned above, each type of VOS object known to the object framework is implemented and deployed by an application, and applications responsible for the creation, deployment and maintenance of VOS objects are referred to as object services. Object services are also regarded as framework objects and as such are assigned with identifiers. Consequently, each service provides access to at least one object; the service object itself. Additionally, a service generates VOS objects, which can be propagated as child objects of the parent service object. For example, a document management service can generate documents and folders, which top level folder objects are then children of the document management service object. The other objects provided by the service can be accessible as indirect children further down the hierarchy. Alternatively, a file system service can provide the roots of file systems as children, just as, for example, Microsoft Windows handles drives as roots for file systems.

Services can be responsible for at least the following three major tasks: mapping framework identifiers to internal VOS objects, accepting method calls for self-deployed VOS objects, and providing visualization for the service's own objects by referring to the portal framework.

Figure 4:
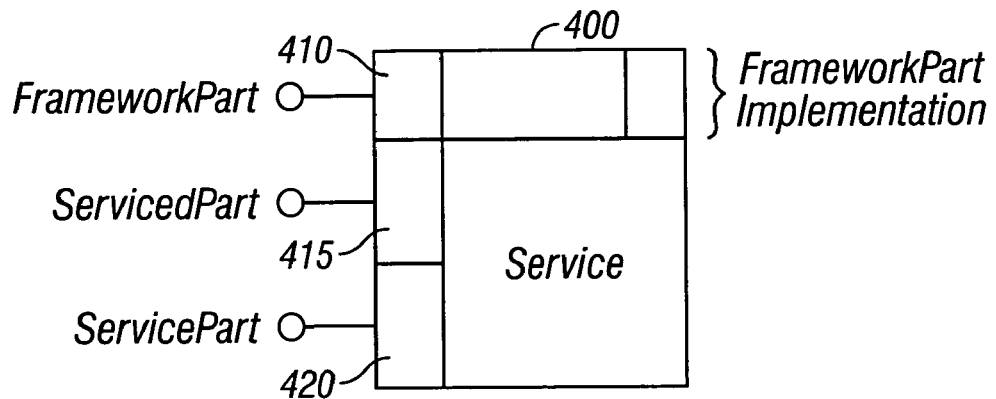
FIG. 4 is a representation of a VOS service object.

Referring to FIG. 4, a service object 400 (which is a VOS object) includes the framework part and serviced part interfaces 410, 415. The object framework maintains standard functionality for services, just as for VOS objects, as described above. As such, the service object 400 additionally includes a third interface to implement the standard functionality, the 'service part' interface 420. The service object 400 can be implemented as a singleton, which is a useful design pattern for allowing only one instance of a class, with the purpose to control object creation by limiting the number of objects to one.

There is one dedicated service that represents the object framework itself. This service handles the services (in the form of service objects), and manages the deployment and registration of service applications. As such, this dedicated service acts as the root of an object tree spanned by the built-in child relationship, by returning the registered service objects as the children of the dedicated (root) service.

Figure 5:
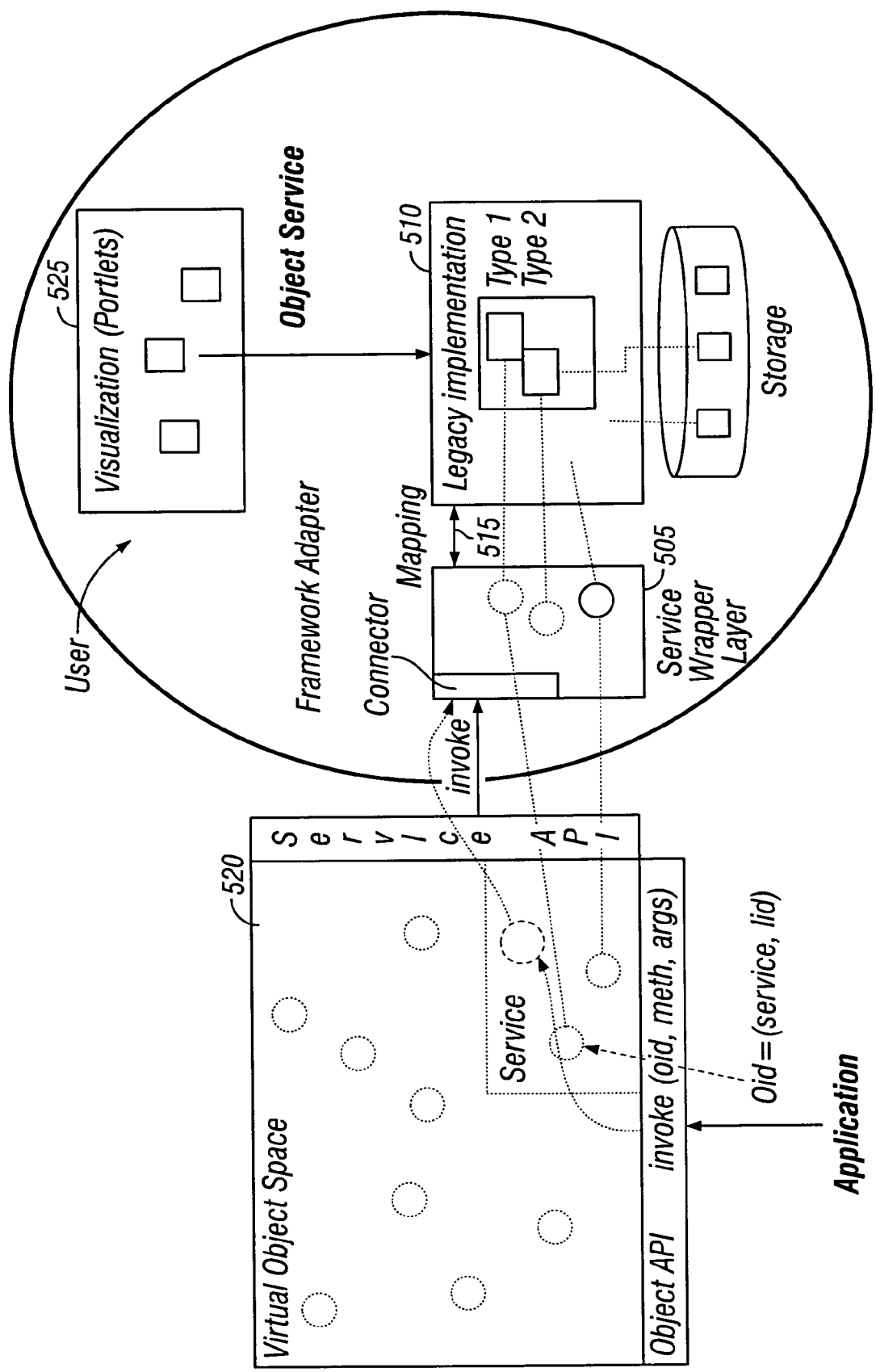
FIG. 5 is a schematic showing an interaction between a VOS service object and an object framework.

Referring to FIG. 5, a service can act as an adapter 505 between a legacy implementation 510 and the object framework 520. The service is tasked to provide two mappings 515: mapping identifiers to VOS objects and to internal object representations in the chosen programming language. The major task of the service acting as an adapter 505 is to accept calls to the standard methods and to map them to the legacy model, returning results that conform to the object model. For example, a set of child objects coming from a legacy implementation have to be mapped to valid object identifiers of the object framework, before the child objects can be returned.

Other possible mappings include events, and, depending on the implementation, specialized legacy object locking and transactional mechanisms. If there are no standard viewers for the objects, the adapter 505 also has to provide object viewers that conform to a chosen portal model. Therefore, the service also provides portlets 525 for visualization of corresponding VOS objects. The portlets 525 interact with the portal framework for a portal layout. The legacy implementation 510 handles the remaining functionality and persistence of the VOS objects provided by the legacy implementation.

Referring to the design project example, the following are examples of services: Microsoft® Word (for text documents), Lotus 1-2-3 (for spreadsheets), Microsoft® Powerpoint (for graphic presentations) and Microsoft® Outlook (for email messages) available from Microsoft Corporation of Redmond, Wash., Adobe® Acrobat (for scanned documents) available from Adobe Systems Incorporated of San Jose, Calif., Visio® 2000 (for drawings) available from Microsoft Corporation, and Internet Explorer (for links to web pages) available from Microsoft Corporation. These can be examples of legacy implementations. As described above, such content drive objects can be handled as separate aspects of the content object.

Object Identifiers

Identifiers are used to uniquely identify all VOS objects in the object framework. An identifier can have a hierarchical structure, where the first levels are predefined by the object framework, while the remaining levels the responsibility of the different object services on their own. The predefined levels are required, because the object framework must be able to identify services, and to map object identifiers to their implementing object services. Within an object service, each exposed VOS object is endowed with a global and unique identifier that can be mapped to the local part of the whole object identifier. This can be mapped to a textual URI (Uniform Resource Identifier) having, for example, the following syntax:

[vos://<destination>]/<service>[/<type>]{/<localid>} [#<aspect>]

The individual components of the URI can include:
locational information, needed for network extension of the object framework;
the service name;
type information, in case the service implements various objects (e.g. documents, folders, etc.); and
a unique key, to directly address a serviced object in the responsibility of the object service.

Referring to the design project example, an identifier for a text document created by the Microsoft® Outlook application could have the following URI:
vos://vos.sap.com/MicrosoftOutlook/mail-message/ c=US;a=;p=SAP;l=server65-030618125418Z-23493

The object framework controls interpretation and routing of the URI in terms of location and service determination, while the remaining information is left to be interpreted by the services themselves.

To map an identifier to a service, the service must be registered at the object framework under a unique name. The object framework keeps track of the service names and the access to the service objects. A VOS object exists in the VOS when a service with the name of the service part of the identifier is registered at the object framework and this service accepts the identifier as a valid identifier. As such, there is no need to register VOS objects at the VOS. As long as a service is able to map the local id part of the URI to a VOS object, for example, in memory, persistent data storage or even only by executing methods, the object virtually exists in VOS.

This is the reason for the term "virtual" in "virtual object space" (VOS). The objects in an application can work with the object framework without needing to physically exist. It is enough to find a service that is willing to accept an identifier. Accordingly, a service potentially can deploy objects to the object framework that do not have any physical representation, for example, an object describing a list of currently logged-in users of the service.

The object framework need only keep information about a VOS object if the object framework itself needs access to the VOS object, for example, for event registrations or associations. Therefore the existence of objects is not handled centrally, but rather is handled decentrally by the object services: the object services must provide a function to check the validity of an identifier. Additionally, the VOS object part of the service interface also includes a function to notify the object framework about a deletion of a VOS object by the object service.

VOS Handle and Mapping VOS Objects to an Object-Based Programming Language

In an object-based programming language, it is useful to map VOS objects to the languages notion of an object. Therefore, a major task of a service object is to provide representatives for the VOS objects. These language objects have a temporary nature, i.e., they are memory copies of persistent objects and live only as long as they are used.

VOS handles are an implementation vehicle for separating references to VOS object representations in the chosen programming environment. The handle is a language object and provides the standard object interface, but contains only the identifier. The reference to the object representative is queried on demand using the object framework, and is transiently, weakly and temporarily stored as a cache for object accesses. The handle is a reference object that decouples a user of a VOS object from the programming implementation of the VOS object itself. The memory copy can be freely created or deleted without affecting the existence of the handle object.

VOS handles can be used to retrieve VOS objects, which are typically not accessed directly for persistency reasons. Relations between VOS objects are mapped to Java references. However, VOS objects need to be stored, and so do relations between VOS objects. Most programming environments, such as the Java environment does not offer support for persistency of references, and so relations have to be described using identifiers. When storing a VOS object, programming language based references initially derived from identifiers have to be mapped back to identifiers again.

VOS objects are not necessarily existent as memory objects at all times. Using Java references to define references to objects implies that all potentially accessible VOS objects have to be restored when a single VOS object is restored as a Java object. Such a procedure would be a waste of resources and is not necessary when using VOS handles. Object framework references are stored as independent Java objects, which include the object identifier and the object interface, and where method calls are forwarded to the corresponding VOS object. Accordingly, Java references describing references between VOS objects do not need to be created immediately at object restoration, but can be constructed at any time required. Therefore, all reference objects need to be stored and restored with the VOS object that holds the reference. However, 'real' physical Java reference is not set up unless the first method is called.

Figure 6:
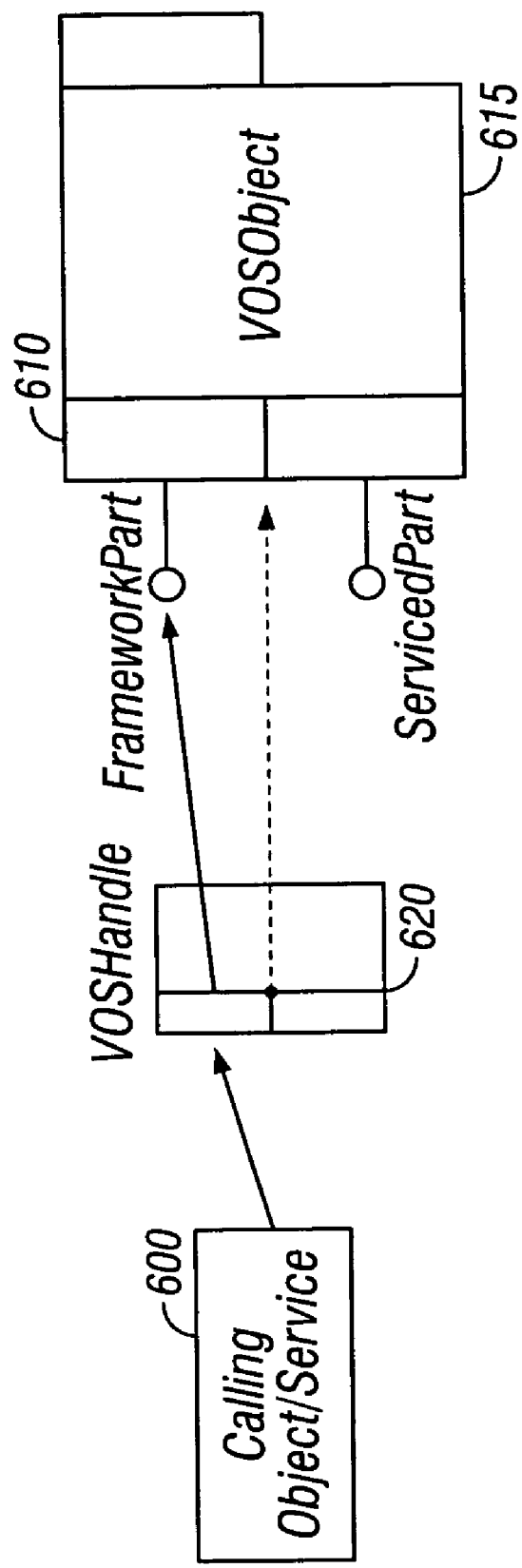
FIG. 6 is a schematic showing an interaction between a VOS service object and a VOS object.

VOS handles implement the interfaces for the VOS objects behind them. Thus, because there are two standard interfaces, the object and the service interface, it is plausible that there have to be least two types of VOS handles, namely a VOS handle for VOS objects and a VOS service handle for service objects. Referring to FIG. 6, the procedure of an application 600 trying to access the framework part interface 610 of a VOS object 615 is shown. Instead of directly addressing the VOS object 615, the application 600 calls the VOS object's VOS handle 620 that is held as a reference to the VOS object. If the VOS object 515 has not been registered at the handle yet, the VOS handle 520 will trigger restoration of the VOS object 515. This is done by the object framework by calling an interface method of the appropriate service object, that must return the VOS object representative in the chosen programming language. The method call is then routed from the VOS handle 520 interface to the corresponding object interface, e.g. the framework part interface 510, and the VOS object 515 can process the call.

VOS handles should always be used when accessing VOS objects; direct reference should be preserved for internal use only, for example, a service object may directly access its own children VOS objects.

Portal Framework

Referring again to FIG. 1, reintegration into the user interface is provided by a layer outside the VOS 110, namely, the portal framework 120. The portal framework 120 provides a common visualization framework 150 and common UI event handling. The portal framework can include at least the following two layers:

1. a technical user interface (UI) framework that provides a wrapper for the front-end technology to support the desired UI elements and the technical infrastructure for drag&drop, context menus, windows/frames etc.; and
2. a VOS related application layer that uses the technical features of the technical UI framework and the standard interface of the VOS Objects to provide higher level support for implementing object visualizations for objects available in the VOS.

The visualization framework is independent of the front-end base technology, and accordingly, there can be support for multiple front-end technologies, such as HTML or WAP.

The task of the technical UI framework is to provide graphical base elements that can then be used by the VOS related visualization layer to build higher level constructs. The base elements can include interaction elements (e.g., button, input fields etc.), structural elements (e.g., windows, frames, nested screen regions, opening and closing of those elements), event propagation between those elements (which is available in the backend and maybe also on the front-end), and the technical basis for context menus and drag&drop.

The task of the VOS related visualization layer, referred to herein as the "visualization framework", is to combine the technical infrastructure with the VOS to provide generic higher level features. For example, the visualization framework can:

1. map object visualization to one or more regions of a display screen;
2. handle object display front-end events to select one or more screen regions to add visualization frames and initiate the object visualization using standard object methods to query the appropriate visualization tool (depending on the desired front-end technology);
3. use the object identifier to support drag&drop between separate regions of a screen;
4. provide support for displaying object references as links on a screen just by specifying the object identifier, and it can then be used to extract short description, icons, context menu, etc. by using the standard interface to build graphical elements like an icon followed by a name with a bubble help and right click context menu (i.e., wherever a reference to a VOS object is displayed, in order of whatever application or tool, the VOS object can automatically be displayed (by double click) and will have an object specific context menu, etc., without any specific implementation of the side of the using portlet that wants to display a link to this object;
5. provide a merge of context related operations on a VOS object with the functionality provided by the VOS object itself (e.g., if a VOS object is displayed in the view of a folder, the context menu should include folder extensions, like "rename" or "unlink from folder"); and
6. merge the service points provided by the generic VOS Object services using the registry with other specific VOS Object functionality to create context menus (e.g., if there is a generic annotation service or a rating service, the VOS Object's context menu will automatically be extended with entries for calling these services, or to access the object-related information provided by these services).

The interaction between the VOS object framework backbone and the visualization framework allows a general unique look and feel for a UI, without the need for implementing everything again and again, in the context of each separate application.

Context Menus

A context menu for an object can be viewed in an object browser, for example, by right clicking on a screen element (e.g. icon) representing the object. The context menu can provide a short cut access to import functionality of the object, for example, navigating an object viewer, deleting the object, calling service points for the object, and initiating actions provided by the object (such as printing or state changes).

Object Browser

Figure 7:
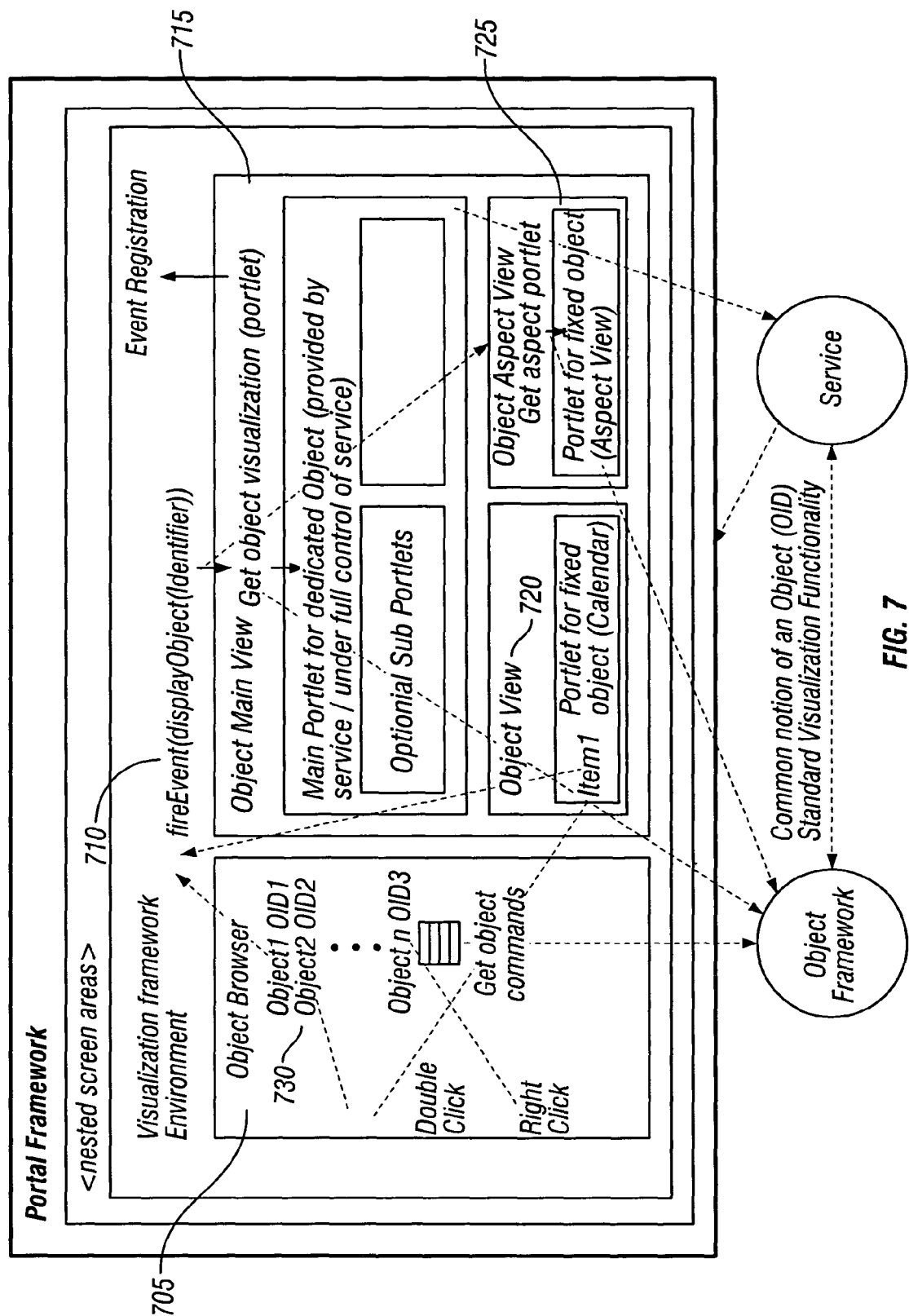
FIG. 7 shows a generic object browser.

Referring to FIG. 7, the visualization framework allows implementation of a viewer for a generic object browser 705, generic folders or central inboxes. For example, with respect to a generic object browser, an automatically generated object link contains actions for displaying (double click) and context menu. When activating a display functionality, a UI event displayObject 710 is fired. Other UI elements can register for this kind of event. Typically, there is an object main view 715 that accepts this event, uses the object identifier to ask the object for its visualization portlet, replaces an already existing viewer for another kind of object with the current object, and forwards the event to this portlet. The portlet is a viewer that is able to display dedicated kinds of objects. Which object is displayed is not coded into the portlet, but is dynamically specified by the object display event. A generic object viewer 720 can then use the object identifier to display the object.

A generic object viewer can keep a history, and allow switching to VOS objects displayed earlier in time, or the viewer can launch another view for an VOS object, which view is displayed in parallel. In this way a display screen can display multiple VOS objects at the same time. There can be other generic views, for example a property viewer or an aspect viewer 725, that also register for a display event. Whenever then an object should be displayed, the object is also stored and used to provide additional information about the object, for example, its properties and/or aspects.

A generic object browser can be a portlet that works on top of the object framework to visualize the structure of the VOS built by the children relations or the associations. The generic object browser does not need to know all kinds of objects, but uses the VOS object's standard methods to query for basic visualization attributes of VOS objects, such as their icons or short descriptions. The object browser provides a link between all the different VOS services linked to the VOS, without needing to know anything about these VOS services. The object browser is a generic navigation tool that can handle all kinds of VOS objects, because the object browser can be based on the abstract information about objects provided by the object framework and the VOS services, in a generic manner.

For example, the object browser can use the get Children method to build an object tree 730. The state of the portlet contains information about the open nodes. If a VOS object provides children, it can be opened to show an additional level of the hierarchy. Normal objects are only displayed if they are marked (e.g., using associations) to be first level objects. Executing means called the execute method can send a display event to an object view frame. If an object is put manually into the browser frame, it is added as a top level node and will be displayed together with directories.

Figure 8:
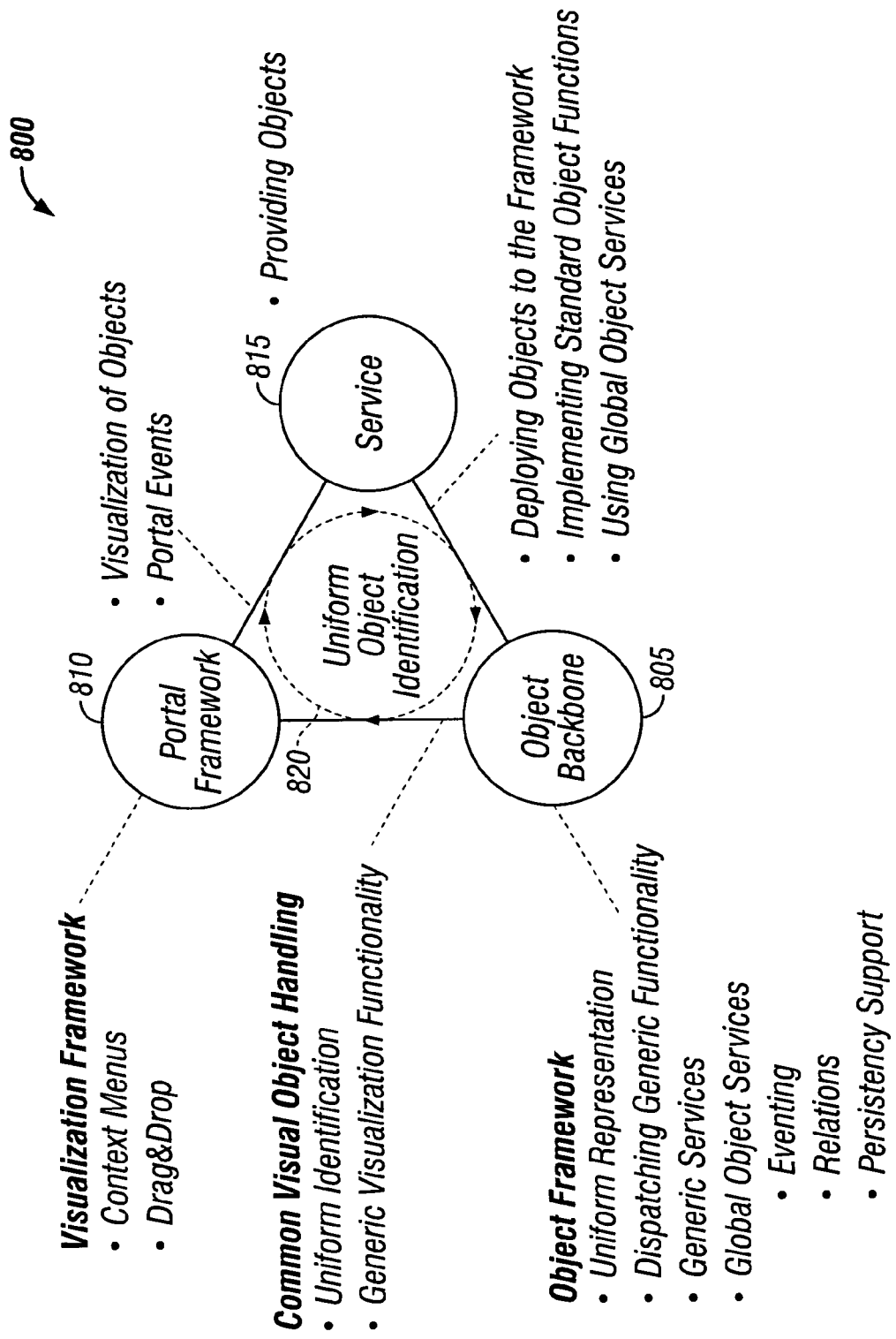
FIG. 8 is a schematic showing the functionality of an object framework.
Figure 9:
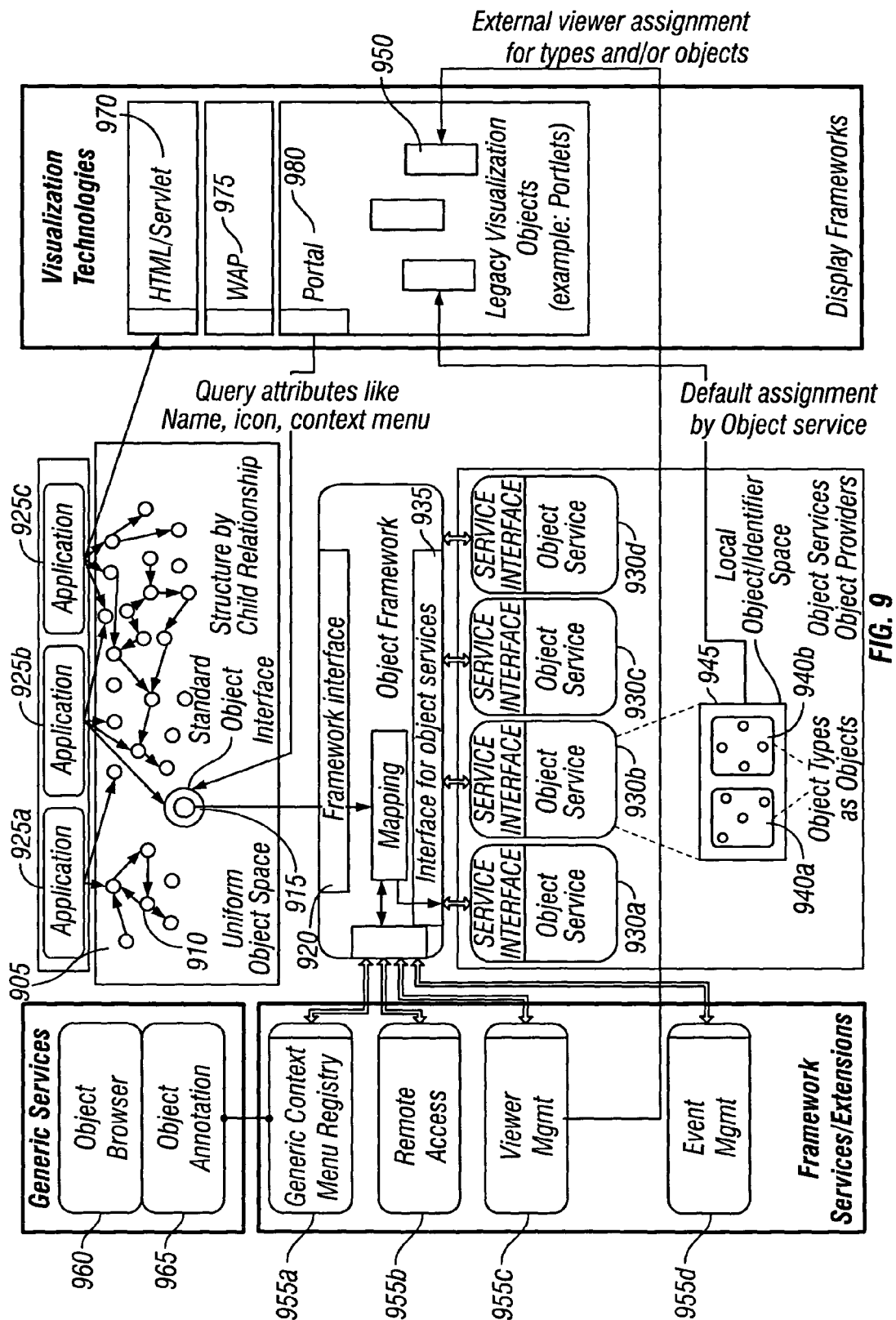
FIG. 9 is a schematic showing the functionality of an object framework.

Referring to FIGS. 8 and 9, schematic representations of the object framework and the framework's functionality are shown. Referring particularly to FIG. 8, the object framework 800 is represented by the object backbone 805, the portal framework 810 and services 815. The object backbone 805 is shown as providing uniform representation of VOS objects, routing generic functionality and providing global object services, including eventing, relations and persistency support. The services 815 are shown as being responsible for providing objects. The relationship of the services 815 to the object backbone 805 relies on deploying objects to the object framework, implementing generic object functions and using generic object services. The portal framework 810 is shown as responsible for the visualization framework, and in particular the drag&drop function for VOS objects and context menus. The relationship between the portal framework 810 and the object backbone 805 relies on common visual object handling, that is uniform identification of VOS objects and generic visualization functionality. The relationship between the portal framework 810 and the services 815 relies on portal events and visualization of objects. In the center of the schematic is depicted the concept of uniform object identification 820, which, for at least the reasons described above, is central to the object framework.

Referring now to FIG. 9, some of the interaction and relationships between the various elements of the object framework are depicted. The VOS or "uniform object space" 905 is shown as populated by VOS objects 910, including the children relationship structure applying to some of the VOS objects. A standard object interface 915 is depicted as interacting with a framework interface 920 of the object framework. Applications 925*a-c* implementing VOS objects included in the VOS 905 are depicted in relation to the VOS objects.

Object services 930*a-d* are depicted interacting with an interface for object services 935 included in the object framework. An object service 930*b* is depicted as included objects types as objects 940*a-b* within a local object/identifier space 945. An object type 940*b* is shown as interacting with a legacy visualization object 950.

Framework services 955*a-d* are depicted interacting with the object framework. Framework services can include a generic context menu registry 955*a*, a remote access service 955*b*, a viewer management service 955*c* and an event management service 955 *d*. The viewer management service 955*c* is shown as implementing an external viewer assignment for types and/or objects of a legacy visualization object.

Generic services, such as an object browser 960 and object annotation 965 are shown in relation to the framework services. The visualization technologies include an HTML/Servlet 970, shown as interacting with an application 925*c*, a WAP 975 and a portal 980.

Web Enabling Engine

In one implementation, a web enabling engine (WEE) can be the infrastructure to integrate various applications into one common user interface. The WEE can be a HTML generating toolset, similar to servlets, but with additional support for nested page areas, event handling among those areas and support for drag&drop and context menus. A web page is based on a hierarchical tree of portlets, where each portlet has an assigned area on the page.

WEE functionality includes customizing the general visual appearance of application components within a common user interface, according to the users' needs and preferences. Furnishing all VOS objects and services with a common look and feel helps to trigger intuitive usage of applications. In one implementation, a standard layout can be flexibly defined using the Personalized Print Markup Language (PPML), which can be modified by explicit runtime implementations. PPML is an XML-based industry standard print language, whose purpose is to accelerate the printing and presentation process of documents that include reusable content by focusing on granularity and reusability of document components. Due to its XML connection, PPML is an open, interoperable, device-independent standard with a strong affinity to web-based applications.

The individual implementation modules of user interface visualization are referred to as portlets. Portlets are small Java-implemented applications, which explicitly define the appearance of objects at the portal level. To allow the development of state-of-the-art user interfaces, the WEE provides a class library that allows easy realization of high-level standards, such as context menus and 'drag & drop' functionality.

Portlets, which are a particular kind of servlet. Servlets are Java based applications running on web servers, which provide an intermediate layer between web servers and web clients. For example, web clients and web servers can communicate using the Hyper Text Markup Protocol (HTTP), a rather straightforward text-based request/response protocol, where communication between participants is realized as follows. The web browser sends an HTTP request for a resource object, for example, a web page. The web server processes the request, generates a HTTP response, and sends the response back to the web browser. Presentational HTML code is embedded into the programming code of the portlet and dynamically generated during runtime.

Portlets can implement a method, referred to herein as the handleRequest method, that allows the addition of user interface elements to a HTML screen generated by the portal infrastructure. Each incoming request gets an assigned response object that is filled by the handleRequest methods of the portlet hierarchy that forms the whole page. The handleRequest method is used to construct the visual response. Technically, user interface elements are included in the response object. Web content objects of the WEE that can be added to the portlet response include: web resources (icons, graphics, etc.), action event links (i.e. push-buttons), drag objects, drop containers, and context menus. For further separation of business logic implementation and visualization, Java Server Pages (JSPs) can also be included into the portal response.

Non-leaf portlets of the portlet hierarchy building the whole page typically forward the request handling to the non-leaf portlets' children, handle the layout of the children on the page and modify or extend their response. The non-leaf portlets can select the visibility of their children on the page, and the layout of the child areas on the page. For example, consider a table control with tab strips, and each tab strip is a sub-portlet. The parent portlet adds the tab strip onto the screen, handles the tab selection and determines which sub-portlet (i.e., which tab strip), should be visible on the page. An easier example is a portlet that divides its page area into two areas, each filled by a separate child portlet.

There are differences between servlets and portlets. First, both have different memory lifecycles on an application server. An application server creates a servlet instance on the first corresponding request, and keeps it until the server shuts down. The WEE creates a distinct portlet instance for each user session, and destroys instances again when an associated session ends.

Second, both approaches differ in their intrinsic event mechanism. User interaction at the user interface level is directly translated into so-called 'events', and these events are routed to associated portlets, implementing the event handling logic. Events transported from the web browser to the application server are referred to as 'action events', while events raised by portlet instances directly on the application server are so-called 'server events'.

Consider an example of a server event being the deletion of an object. The action event for calling the deletion method of an object is routed by the WEE to the registered portlet on the application server. However, the object might be handled by other portlets used on the same page. The portlet handling the provoked action event will then raise a server event to inform all other portlets about the deletion of the specified object. These kinds of events have to be distinguished from the VOS eventing. VOS events are not portal or UI related, but rather there is an event mechanism among VOS objects in the VOS, not among portlets, building a UI. With respect to the deletion example, the action event should map to a call of a VOS operation to delete the object. However, the object to be deleted may be referenced by other objects that include the object, for example, as an attachment. In that case, the object deletion should raise an ObjectDeleted VOS event. This allows registered handlers or registered objects to get informed about this change in the VOS.

The WEE forwards all events, and not only calls the handleRequest method of all related portlets, but also performs a complete event cycle for all linked portlets first. Thus, instance variables of a portlet may perfectly store the state on an application, and may be used to represent the state at the user interface level via the handleRequest method. The separation of event handling and response generation has the following advantage: the event handling portlets can raise further server events that will be completely handled before a response is generated. Therefore, the response generation is based on the latest state of the UI, if it has been modified by the events. If both tasks, i.e., the event handling and the response generation, were done in a single cycle, then events raised by portlets later in the response processing would have no influence on the response of portlets processed earlier, which would result in inconsistent page content.

More about VOS Services

Different types of services include framework services, generic services and object services. A framework service is an extension of the functionality of the object framework. A framework service can, for example, provide a complex event registration scheme, or a remote object access. In general, a framework service is embedded in the functionality of the object backbone, and can influence the mapping of the standard object functionality provided on the interface level of VOS objects to the object services implementing the object functionality.

A generic service is a service implementing functionality using the standard interface of a VOS object. A generic service uses the object identity or generally available features of a VOS object, and is therefore not based on specific object types or implementations. A generic service can work with each kind of VOS object available in the VOS. The visualization framework can be seen as a special case of such a generic service. Typically generic services provide a service for visualization and do not necessarily provide their own object types. However, such a service can be an object service, and as such can provide it's own objects for the framework. For example, a generic folder service that implements generic folders that can keep all kinds of children, namely links to objects of any type. An example, of an objectless generic service can be a top level portlet for the interaction between the object framework and the portal framework, and can provide visualization utilities for objects or can provide general object functionality, discussed further below. Generic services can be implemented on top of the object framework by using standard operations of VOS objects and the object framework API, having the advantage that they can be added one after the other later on.

An object service provides one or more object types embedded into the object framework. The task of an object service is to deploy/put objects into the VOS. Without any object services, the VOS would be empty. Examples includes a calendar, folder, invoice or inbox. There can be one special object service coming with the object framework: the VirtualObjectSpace service ("VOS service"). This is the object service that represents the object services themselves. As discussed above, each object service is a VOS object of the VOS. The VOS service manages these services and acts as the service for all object service objects. As such, the VOS service is also an object, the root object of the logical object space structure spanned by the children relationship.

The VOS service objects children are the service objects. They again can provide an implementation for their own children interface to provide access to some or all of their objects. In this sense, there can be two namespaces: the identifier namespace that is hierarchical, and a pseudo-hierarchical namespace spanned by following the children relationship. The pseudo-hierarchical namespace looks hierarchical, but an object can occur at several places, so it is not a physical tree, because it can include cycles, and it can be incomplete in the sense that not all objects can be reachable from the global root just by following the children relationship. This second namespace can be used by the object browser to browser the VOS. The root for such a browser at the UI level can be dependent on the user and the current context, so that different users can see different parts of the VOS for two reasons: the root object is different and the getChildren standard method can return a context dependent list of child objects. For example, when entering a collaborative room, the root of the object browser visible on the collaboration page can be the root object of the room, and therefore it is not possible to navigate outside this room. However, there can be objects that are shared among rooms in the sense that they are reachable from more than one room root object, following the children relationship.

With respect to legacy implementations, for example, Microsoft® Word and Adobe® Acrobat mentioned above, there are at least three ways to support the related objects.

1. Use an adapter as described above.

In this case, the legacy implementation must provide its own persistency, for example, a dedicated file system. The mapping between the backend objects and the VOS objects, maps the service relative part of the identifier to the used pathname of the data in a chosen file system. Additionally, some methods are provided that map the standard attributes to the object framework. The adapter provides a viewer that maps the legacy viewing application of raw data stored in the file system to the portal framework. For example, for Internet Explorer, the viewer can be a portlet using an OLE plug-in. In this case, the adapter just supports such object without structured file or object names. This information can be handled by a folder service that then only keeps labeled references to those objects. The adapter can span its own identification space for different internal object types and map these identifiers to object functionality in the back-end application.

2. Use a files system service that provides access to a structured persistence medium.

This kind of mapping is more appropriate for documents rather than applications. Together with abstract data types, it can be possible to assign dedicated viewers independent of the concrete technical type (file) of the object. The object service itself only provides persistence for an unstructured data stream. In this case, there would be no dedicated object service for those objects, but only viewers that are type-specific and can interpret the abstract data stream. Then there is no possibility to map special features of the legacy object to the object framework, for example, a hierarchical structure. For example, Microsoft® Outlook would be a black box application.

3. Combination of both of the above, using the feature of aspects.

A content service can support at least two aspects for its objects: raw data and logical object view using the abstract data type to map the raw data to an anonymous object provided by an object service that is able to map data to a logical view of the data. It creates temporary memory objects out of a data stream and visa versa, and uses the persistent content service for spanning a logical namespace and doing the persistence. Such a service is an extension of a typical service, because it must provide an additional method for restoring the object out of a data stream. In contrast to a legacy adapter, native object services are service implementations that do the whole object implementation on their own. They do not use an already existing application written for another environment to do, a mapping, but implement the whole functionality for, and in, the environment of the object framework.

There are different ways to link a service to the object framework. A native service is fully implemented on the platform where the object framework lives. A native service implementation does not use a separate model implementation, but directly implements the VOS objects to be deployed under the constraints of the object framework, and is responsible for the persistence of VOS objects.

An embedded service implements service specific proxy objects on the platform where the object framework lives. Implementation of the methods is done using local resources and resources on the side where the service physically resides. That is, the mapping of a remote service to the object framework is done locally under full control of the service provider represented as an adapter. With such an adapter service, it is possible to integrate any kind of pre-existing application or application objects into the object framework. There are two major preconditions. The legacy service must be accessible from the platform, where the object framework lives and the UI technology must be able to integrate a foreign UI. The second precondition can be weakened, if the UI is freshly implemented on the side of the adapter using the visualization framework. Otherwise, there can be a weak integration, because features like drag&drop or context menus can work differently in a foreign UI framework. The way an adapter integrates a legacy application can vary from deploying the whole legacy application just as a single object up to mapping each element of the legacy application to a separate VOS object. The first solution would be restrictive, because the elements of such an application could not be handled separately at the object level, and only the application representative could be moved around in the VOS.

A remote service is accessible by link to the remote object framework host, if the object framework is extended over a network.

The computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor; and method steps can be performed by a programmable processor executing a program of instructions to perform functions by operating on input data and generating output.

To provide for interaction with a user, a computer system can be used having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments have been described. Nevertheless, it will be understood that various modifications may be made. For example, the steps described can be performed in a different order and still achieve desirable results. Accordingly, other embodiments are within the scope of the following claims.

COMPUTER PROGRAM LISTINGS

The following computer program listings 1 through 11 include examples of the Java interfaces that can be used to implement the VOS and other program modules that can be used to implement the object framework, including visualization.

What is claimed is:

1. A computer-implemented software application framework embodied on a computer comprising:
 a virtual object space providing access to a plurality of objects, each object having a set of functionality and being identifiable by a unique identifier provided by the virtual object space, and providing generic object functionality for the plurality of objects including an associations and transactions functionality for relating the plurality of objects and interaction between the plurality of objects, the associations and transactions functionality configured to provide transactions using a two-phase commit to handle different memory copies of object states of the plurality of objects, a distribution functionality for locking, flushing, and copying of the virtual object space, and a persistency functionality for maintaining persistency of the plurality of objects, the generic object functionally including a first interface for applications using the plurality of objects and a second interface for a service deploying the plurality of objects, the service providing an adapter to map the unique identifier to the plurality of objects and to objects internal to the service, the access being a virtual access provided using the unique identifier without physically storing the plurality of objects at the virtual object space; and a visualization framework for visualizing the plurality of objects independently of an application implementing the object, each object being visualized using the object's unique identifier and according to the object's corresponding set of functionality;

wherein the plurality of objects includes one or more service objects that are each configured to deploy at least one other object of the plurality of objects into the virtual object space and to process the at least one other object to perform one or more of a plurality of operations using the at least one other object;

wherein at least some of the plurality of operations include operations that are implemented by at least one of the one or more service objects to adapt an external legacy service to perform operations associated with the external legacy service on another object deployed and processed by the at least one of the one or more service objects.

2. The computer-implemented framework of claim 1, further comprising:

framework services providing common event handling of the plurality of objects.

3. The computer-implemented framework of claim 1, further comprising:

providing a portlet to access the generic object functionality to visualize the structure of the plurality of objects.

4. A computer-implemented object browser computer framework embodied on a computer comprising:

a virtual object space providing access to a plurality of objects, each object being identifiable by a unique identifier, and providing generic object functionality for the plurality of objects including an associations and transactions functionality for relating the plurality of objects and interaction between the plurality of objects, the associations and transactions functionality configured to provide transactions using a two-phase commit to handle different memory copies of object states of the plurality of objects, a distribution functionality for locking, flushing, and copying of the virtual object space, and a persistency functionality for maintaining persistency of the plurality of objects, the generic object functionally including a first interface for applications using the plurality of objects and a second interface for a service deploying the plurality of objects, the service providing an adapter to map the unique identifier to the plurality of objects and to objects internal to the service, the access being a virtual access provided using the unique identifier without physically storing the plurality of objects at the virtual object space;

a user interface for receiving input from a user relating to a desired arrangement of one or more of the plurality of objects; and a visualization framework for visualizing objects according to the desired arrangement, each object being visualized using the object's unique identifier independently of an application implementing the object;

wherein the plurality of objects includes one or more service objects that are each configured to deploy at least one other object of the plurality of objects into the virtual object space and to process the at least one other object to perform one or more of a plurality of operations using the at least one other object;

wherein at least some of the plurality of operations include operations that are implemented by at least one of the one or more service objects to adapt an external legacy service to perform operations associated with the external legacy service on another object deployed and processed by the at least one of the one or more service objects.

5. The computer-implemented object browser framework of claim 4, wherein the user interface further includes allowing a user to browse the plurality of objects independent of one or more applications implementing the objects.

6. The computer-implemented object browser framework of claim 4, wherein the desired arrangement is hierarchical.

7. The computer-implemented object browser framework of claim 4, wherein the visualization framework includes an object viewer.

8. A method of facilitating software object browsing, the method comprising:

providing access to software objects through a virtual object space in which each software object has an associated set of functionality and is identifiable by a unique identifier, and providing generic object functionality for software objects including an associations and transactions functionality for relating the software objects and interaction between the software objects, the associations and transactions functionality configured to provide transactions using a two-phase commit to handle different memory copies of object states of the plurality of objects, a distribution functionality for locking, flushing, and copying of the virtual object space, and a persistency functionality for maintaining persistency of the software objects, the generic object functionally including a first interface for applications using the plurality of objects and a second interface for a service deploying the plurality of objects, the service providing an adapter to map the unique identifier to the plurality of objects and to objects internal to the service, the access being a virtual access provided using the unique identifier without physically storing the plurality of objects at the virtual object space; and visualizing objects independently of an application implementing the software objects, each object being visualized using the object's unique identifier and according to the object's corresponding set of functionality;

wherein the plurality of objects includes one or more service objects that are each configured to deploy at least one other object of the plurality of objects into the virtual object space and to process the at least one other object to perform one or more of a plurality of operations using the at least one other object;

wherein at least some of the plurality of operations include operations that are implemented by at least one of the one or more service objects to adapt an external legacy service to perform operations associated with the external legacy service on another object deployed and processed by the at least one of the one or more service objects.

9. The method of claim 8, further comprising:
providing framework services providing common event handling of the software objects.

10. The method of claim 8, further comprising:
providing a portlet to access the generic object functionality to visualize the structure of the software objects.

11. The method of claim 8, further comprising:
implementing the plurality of objects to include the first interface accessible by the framework and the second interface accessible by a service acting as an adapter between the framework and an application separate from the framework.

\* \* \* \* \*